UNITED STATES PATENT OFFICE.

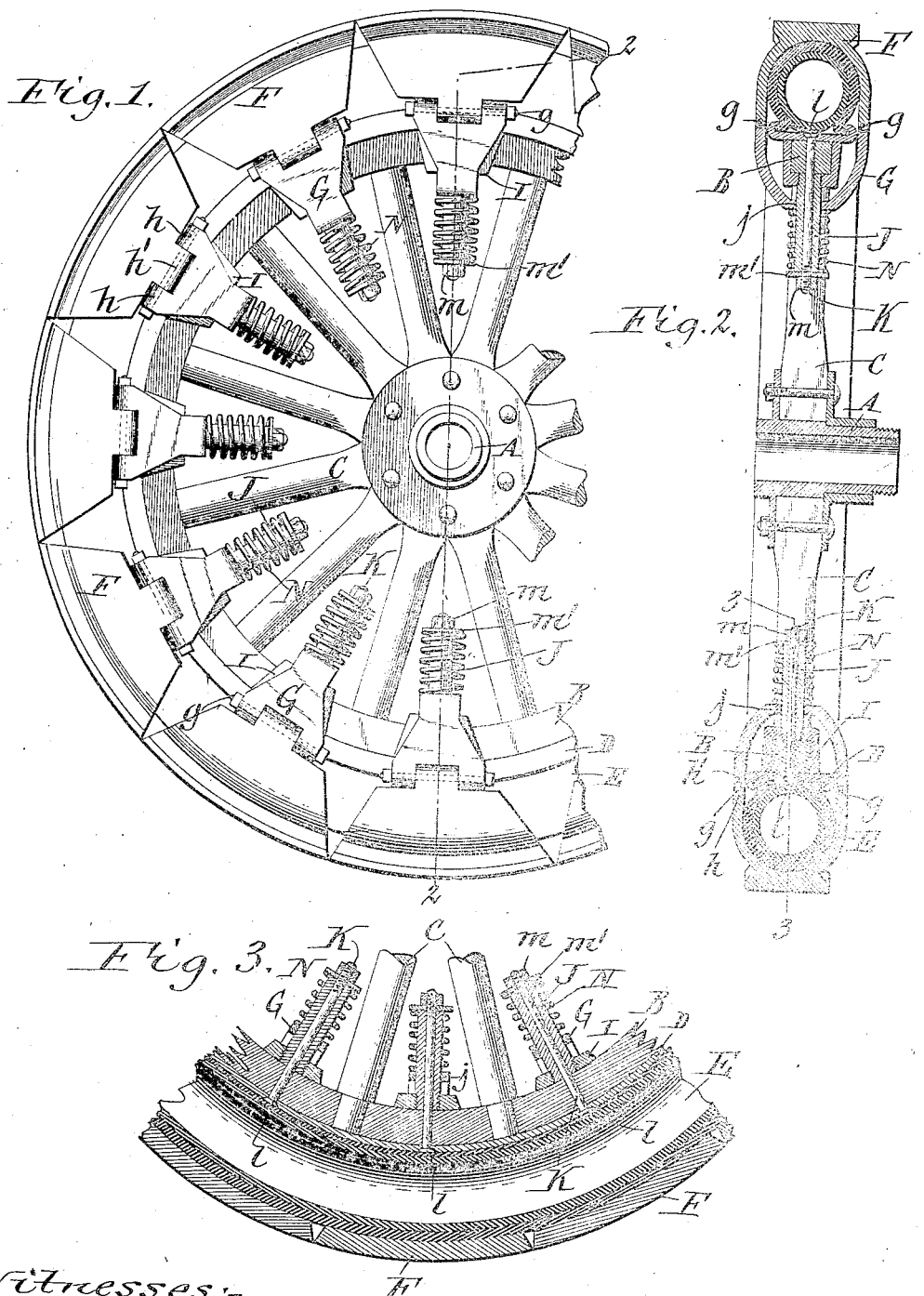

JASON RICHARDSON, OF BUFFALO, NEW YORK.

TIRE-PROTECTOR.

943,463.

Specification of Letters Patent. Patented Dec. 14, 1909.

Application filed May 28, 1909. Serial No. 498,818.

*To all whom it may concern:*

Be it known that I, JASON RICHARDSON, a citizen of the United States, residing at Buffalo, in the county of Erie and State of New York, have invented a new and useful Improvement in Tire-Protectors, of which the following is a specification.

This invention relates to an improved armor or protector of simple, efficient and inexpensive construction which is more particularly designed for preventing puncturing of pneumatic tires but which also operates as an auxiliary cushioning means for the wheel, so that it supplements the resilience of the tire and thus serves to carry the load when used on a pneumatic tire which has become deflated from any cause. This armor may also be used in connection with a solid elastic tire to increase the cushioning effect on the wheel.

In the accompanying drawings: Figure 1 is a fragmentary side elevation of a wheel having a pneumatic tire and equipped with my improved armor. Fig. 2 is a vertical transverse section of the same in line 2—2, Fig. 1. Fig. 3 is a fragmentary longitudinal section in line 3—3, Fig. 2.

Similar letters of reference indicate corresponding parts throughout the several views.

Although my invention is applicable to wheels and tires of various forms, that shown in the drawings, as an example, comprises a hub A, a felly B, spokes C connecting the hub and felly, a rim D having an outwardly facing channel and surrounding the felly, and a pneumatic tire E arranged in the channel of the rim. My improved armor which coöperates with this wheel and tire is constructed as follows:—F represents a plurality of bearing sections or shoes which are arranged in an annular row around the outer side of the tire, so as to form practically a continuous protecting facing therefor. Each of these sections is preferably of a length equal to or nearly so to the distance between two spokes of the wheel and is substantially crescent shaped in cross section and channel or trough shaped lengthwise, its concave or channeled inner side being adapted to receive the tread of the tire and its outer side or tread being preferably substantially flat, as shown in Fig. 2. G represents a plurality of yokes forming part of the means whereby the bearing sections or shoes are connected with the wheel. Each of these yokes has preferably the form of a bow or arch which straddles the felly and rim from the inner side and is detachably connected at its opposite ends by bolts $g$ each of which passes circumferentially through coinciding eyes $h$, $h^1$ on the companion opposing ends of the yoke and the bearing section, as shown in Figs. 1 and 2. I represents a plurality of saddles each of which straddles the felly within one of the yokes and bears at its opposite ends against the inner side of the rim. From the central part or crown of each of the saddles a guide post or stem J projects outwardly through an opening $j$ in the crown or central part of the adjacent yoke, this post being preferably detachably connected with the respective saddle by a screw joint, as shown, so as to permit of employing different widths of saddles to suit the particular width of felly on the wheel to which the armor is applied. Extending radially through the rim, felly, and each post is a tie bolt K which has a head $l$ at its outer end bearing against the outer side of the rim and a nut $m$ at its inner end. A washer $m^1$ is interposed between the nut $m$ and the inner end of the adjacent post which washer is of larger diameter than the guide post or stem, so as to form a shoulder on the latter. N represents spiral springs each surrounding one of the posts and bearing at its outer end against the inner side of the adjacent yoke while its inner end bears against the shoulder formed by the washer at the inner end of the respective tie bolt. The resilience of the several springs N holds the bearing sections or shoes yieldingly in their outermost position thereby aiding the pneumatic tire in forming a cushion support for the load on the wheel. As the tire and the shoes are pressed inwardly toward the rim under the action of the load on the wheel, the yokes slide on the guide posts or stems and when the wheel is relieved of this load, the springs again move the shoes outwardly into their normal position, this movement being possible by providing sufficient space between adjacent bearing sections or shoes for this purpose.

The shoes are constructed of iron, steel or other strong, hard and durable material which will withstand the wear to which the wheel is subjected while in use and which cannot be penetrated by sharp objects on the roadway, thereby preventing injury to the tire and possible puncturing and deflation from this source, thereby maintaining the wheel in the highest state of efficiency.

If for any reason the tire should be injured and become deflated, as for instance when blown out, due to excessive pressure or a flaw in its manufacture, the spring supported shoes will operate to support the load on the wheel independently of the tire, thereby saving the latter from undue wear until such time as a repair of the same can be effected.

My improved tire armor or protector does not add materially to the cost of the equipment, it does not detract from the appearance of the wheel, and it can be easily applied to any of the standard wheels now on the market.

I claim as my invention:

1. A tire protector comprising a plurality of channel shaped bearing sections or shoes which are adapted to engage their concave sides with the tread of the tire, and each provided on its opposite lateral sides with tangential eyes, a plurality of yokes adapted to extend over the inner side of the felly of the wheel and each provided on its opposite sides with tangential eyes, tangential bolts passing through the eyes of the yokes and the eyes on the corresponding sides of the bearing sections, and a spring bearing against each yoke and operating to hold the respective bearing section yieldingly in its outermost position.

2. A tire protector comprising a plurality of channel shaped bearing sections or shoes which are adapted to engage their concave sides with the tread of the tire, a plurality of yokes adapted to extend over the inner side of the felly of the wheel and each connected at its opposite sides with the opposite sides of an adjacent shoe, a plurality of saddles adapted to straddle the inner side of the felly, a guide stem or post extending inwardly from each saddle and through an opening in the adjacent yoke, and a spring surrounding each of said stems and operating on the adjacent yoke for holding the respective bearing section yieldingly in its outermost position.

3. A tire protector comprising a plurality of channel shaped bearing sections or shoes which are adapted to engage their concave sides with the tread of the tire, a plurality of yokes adapted to extend over the inner side of the felly of the wheel and each connected at its opposite sides with the opposite sides of an adjacent shoe, a plurality of saddles adapted to straddle the inner side of the felly, a guide stem or post extending inwardly from each saddle and through an opening in the adjacent yoke, a plurality of tie bolts each passing through the rim and felly of the wheel and through one of the guide stems, and a spring surrounding the inner end of each stem and bearing at its outer end against the adjacent yoke and at its inner end against a shoulder on the adjacent stem.

Witness my hand this 25th day of May, 1909.

JASON RICHARDSON.

Witnesses:
 THEO. L. POPP,
 ANNA HEIGIS.